(12) United States Patent
Perito et al.

(10) Patent No.: US 11,803,841 B1
(45) Date of Patent: Oct. 31, 2023

(54) DISCOVERY AND COMMUNICATION USING DIRECT RADIO SIGNAL COMMUNICATION

(71) Applicant: Block, Inc., Oakland, CA (US)

(72) Inventors: Daniele Perito, San Francisco, CA (US); Shuvo Chatterjee, San Francisco, CA (US); Nathan Spindel, San Francisco, CA (US); Jesse Wilson, Waterloo (CA)

(73) Assignee: Block, Inc., Oakland, CA (US)

( * ) Notice: Subject to any disclaimer, the term of this patent is extended or adjusted under 35 U.S.C. 154(b) by 394 days.

(21) Appl. No.: 15/923,682

(22) Filed: Mar. 16, 2018

Related U.S. Application Data

(63) Continuation of application No. 14/066,459, filed on Oct. 29, 2013, now abandoned.

(51) Int. Cl.
*G06Q 20/38* (2012.01)
*G06Q 20/32* (2012.01)

(52) U.S. Cl.
CPC ....... *G06Q 20/382* (2013.01); *G06Q 20/3278* (2013.01)

(58) Field of Classification Search
USPC ................................ 705/17, 18, 44; 235/383
See application file for complete search history.

(56) References Cited

U.S. PATENT DOCUMENTS

| | | |
|---|---|---|
| 3,121,945 A | 2/1964 | Rackley, III et al. |
| 4,845,740 A | 7/1989 | Tokuyama et al. |
| 5,463,678 A | 10/1995 | Kepley, III et al. |
| 5,729,591 A | 3/1998 | Bailey |
| 5,751,373 A | 5/1998 | Ohyama et al. |
| 5,760,773 A | 6/1998 | Berman et al. |
| 5,764,742 A | 6/1998 | Howard et al. |

(Continued)

FOREIGN PATENT DOCUMENTS

| | | |
|---|---|---|
| CA | 2 777 885 A1 | 5/2013 |
| DE | 20 2012 100 620 U1 | 8/2012 |

(Continued)

OTHER PUBLICATIONS

"Bluetooth Low Energy," Wikipedia, Retrieved from the Internet URL: http://en.wikipedia.org/wiki/Bluetooth_low_energy, on Nov. 11, 2014, pp. 1-9.

(Continued)

*Primary Examiner* — Christine M Behncke
(74) *Attorney, Agent, or Firm* — Polsinelli PC

(57) ABSTRACT

Methods, systems, and apparatus, including computer programs encoded on computer storage media, for discovery of and communication with nearby devices using direct radio signal communication. One of the methods includes receiving, by a payment service system, a message authorizing a payment from a user account to a merchant account, wherein the message was sent by a user device using direct radio signal communication to a nearby merchant device and forwarded to the payment service system by the merchant device. The message is decrypted to obtain a session token that authenticates the user device as being associated with the user account. If the session token is valid a payment transaction is conducted between the user account and the merchant account.

20 Claims, 10 Drawing Sheets

(56) References Cited

U.S. PATENT DOCUMENTS

| | | |
|---|---|---|
| 5,850,599 A | 12/1998 | Seiderman |
| 5,945,654 A | 8/1999 | Huang |
| 6,026,375 A | 2/2000 | Hall et al. |
| D424,036 S | 5/2000 | Arora et al. |
| 6,076,079 A | 6/2000 | Boston et al. |
| 6,129,277 A | 10/2000 | Grant et al. |
| D437,858 S | 2/2001 | Yasui et al. |
| 6,234,389 B1 | 5/2001 | Valliani et al. |
| 6,262,724 B1 | 7/2001 | Crow et al. |
| 6,308,227 B1 | 10/2001 | Kumar et al. |
| 6,332,024 B1 | 12/2001 | Inoue et al. |
| D454,356 S | 3/2002 | Hoxie et al. |
| 6,481,623 B1 | 11/2002 | Grant et al. |
| 6,497,368 B1 | 12/2002 | Friend et al. |
| 6,505,046 B1 | 1/2003 | Baker |
| 6,536,670 B1 | 3/2003 | Postman et al. |
| 6,579,728 B2 | 6/2003 | Grant et al. |
| 6,636,835 B2 | 10/2003 | Ragsdale-Elliott et al. |
| 6,850,147 B2 | 2/2005 | Prokoski et al. |
| 6,944,782 B2 | 9/2005 | von Mueller et al. |
| 6,947,727 B1 | 9/2005 | Brynielsson |
| 7,003,316 B1 | 2/2006 | Elias et al. |
| 7,004,382 B2 | 2/2006 | Sandru |
| 7,149,296 B2 | 12/2006 | Brown et al. |
| 7,163,148 B2 | 1/2007 | Durbin et al. |
| 7,252,232 B2 | 8/2007 | Fernandes et al. |
| 7,309,012 B2 | 12/2007 | von Mueller et al. |
| D560,680 S | 1/2008 | Armendariz |
| 7,324,836 B2 | 1/2008 | Steenstra et al. |
| 7,343,317 B2 | 3/2008 | Jokinen et al. |
| 7,343,565 B2 | 3/2008 | Ying et al. |
| 7,363,054 B2 | 4/2008 | Elias et al. |
| 7,409,234 B2 | 8/2008 | Glezerman |
| 7,433,452 B2 | 10/2008 | Taylor et al. |
| D582,939 S | 12/2008 | Neuhaus |
| D593,580 S | 6/2009 | Truelove et al. |
| 7,581,678 B2 | 9/2009 | Narendra et al. |
| 7,708,189 B1 | 5/2010 | Cipriano |
| D616,897 S | 6/2010 | Chaudhri et al. |
| 7,810,729 B2 | 10/2010 | Morley |
| 7,831,246 B1 | 11/2010 | Smith et al. |
| 7,831,520 B2 | 11/2010 | Mengerink |
| 7,848,765 B2 | 12/2010 | Phillips et al. |
| 7,896,248 B2 | 3/2011 | Morley |
| 7,918,394 B1 | 4/2011 | Morley, Jr. |
| D650,794 S | 12/2011 | Pereira et al. |
| 8,090,351 B2 | 1/2012 | Klein |
| 8,126,806 B1 | 2/2012 | DiMartino et al. |
| 3,127,983 A1 | 3/2012 | Block et al. |
| 8,135,624 B1 | 3/2012 | Ramalingam et al. |
| 8,160,959 B2 | 4/2012 | Rackley, III et al. |
| D669,090 S | 10/2012 | Rosen |
| 8,281,998 B2 | 10/2012 | Tang et al. |
| 8,396,808 B2 | 3/2013 | Greenspan |
| D680,551 S | 4/2013 | Ishii et al. |
| 8,459,546 B1 | 6/2013 | Block et al. |
| 3,489,112 A1 | 7/2013 | Roeding et al. |
| 8,478,692 B2 | 7/2013 | Carlson et al. |
| 8,485,440 B1 | 7/2013 | Arora et al. |
| 8,510,220 B2 | 8/2013 | Rackley, III et al. |
| 3,639,629 A1 | 1/2014 | Hoffman |
| 8,635,157 B2 | 1/2014 | Smith et al. |
| 8,654,222 B2 | 2/2014 | Kuwazoe |
| 8,655,782 B2 | 2/2014 | Poon et al. |
| 8,659,427 B2 | 2/2014 | Brown et al. |
| 8,660,965 B1 | 2/2014 | Bickerstaff |
| D702,717 S | 4/2014 | Abratowski et al. |
| 8,700,527 B2 | 4/2014 | Dolphin et al. |
| D705,805 S | 5/2014 | Schweizer |
| D705,807 S | 5/2014 | Tursi |
| D706,796 S | 6/2014 | Talbot |
| D707,704 S | 6/2014 | Capua et al. |
| 8,751,380 B2 | 6/2014 | Harvey et al. |
| D710,866 S | 8/2014 | Safa |
| D714,332 S | 9/2014 | Jung et al. |
| D714,822 S | 10/2014 | Capua et al. |
| D717,328 S | 11/2014 | Lin |
| 8,886,569 B2 | 11/2014 | Patel et al. |
| 8,972,297 B2 | 3/2015 | Kay et al. |
| D732,059 S | 6/2015 | Andersen et al. |
| 9,107,064 B1 | 8/2015 | Ramalingam et al. |
| 9,436,955 B2 | 9/2016 | Dorsey et al. |
| 9,576,289 B2 | 2/2017 | Henderson et al. |
| 9,589,269 B2 | 3/2017 | Henderson et al. |
| 9,633,352 B2 | 4/2017 | Henderson et al. |
| 9,799,034 B1 | 10/2017 | Varma et al. |
| 9,830,606 B2 | 11/2017 | Boncimino |
| 9,959,529 B1 | 5/2018 | Varma et al. |
| 10,026,083 B1 | 7/2018 | Varma et al. |
| 10,068,272 B1 | 9/2018 | Varma et al. |
| 11,263,620 B2 * | 3/2022 | Zaytzsev ............ G06Q 20/3825 |
| 2002/0095380 A1 | 7/2002 | Singhal |
| 2002/0181710 A1 | 12/2002 | Adam et al. |
| 2003/0037001 A1 | 2/2003 | Richardson |
| 2004/0012875 A1 | 1/2004 | Wood |
| 2004/0041911 A1 | 3/2004 | Odagiri et al. |
| 2004/0058705 A1 | 3/2004 | Morgan et al. |
| 2005/0236480 A1 | 10/2005 | Vrotsos et al. |
| 2005/0247787 A1 | 11/2005 | Von Mueller et al. |
| 2005/0271199 A1 | 12/2005 | Collins, Jr. |
| 2006/0138219 A1 | 6/2006 | Brzezniak et al. |
| 2006/0148520 A1 | 7/2006 | Baker et al. |
| 2006/0273158 A1 | 12/2006 | Suzuki |
| 2006/0273163 A1 * | 12/2006 | Gusler .................. G06Q 30/06 |
| | | 235/383 |
| 2007/0214237 A1 | 9/2007 | Stibel et al. |
| 2008/0040146 A1 | 2/2008 | Rogovin |
| 2008/0172733 A1 | 7/2008 | Coriaty et al. |
| 2008/0208762 A1 | 8/2008 | Arthur et al. |
| 2009/0144161 A1 | 6/2009 | Fisher |
| 2009/0158212 A1 | 6/2009 | Dykstra-Erickson et al. |
| 2009/0177581 A1 | 7/2009 | Garcia et al. |
| 2009/0187492 A1 | 7/2009 | Hammad et al. |
| 2009/0313165 A1 | 12/2009 | Walter |
| 2010/0010906 A1 | 1/2010 | Grecia |
| 2010/0063889 A1 | 3/2010 | Proctor, Jr. et al. |
| 2010/0070378 A1 | 3/2010 | Trotman et al. |
| 2010/0076853 A1 | 3/2010 | Schwarz |
| 2010/0108762 A1 | 5/2010 | Morley |
| 2010/0121726 A1 | 5/2010 | Coulter et al. |
| 2010/0125495 A1 | 5/2010 | Smith et al. |
| 2010/0174596 A1 | 7/2010 | Gilman et al. |
| 2010/0182341 A1 | 7/2010 | Lee et al. |
| 2010/0208876 A1 | 8/2010 | Tsuei |
| 2010/0216396 A1 | 8/2010 | Fernandez et al. |
| 2010/0217675 A1 | 8/2010 | Bookstaff |
| 2010/0217699 A1 | 8/2010 | Bookstaff |
| 2010/0222000 A1 | 9/2010 | Sauer et al. |
| 2010/0250410 A1 | 9/2010 | Song et al. |
| 2010/0325048 A1 | 12/2010 | Carlson et al. |
| 2011/0022472 A1 | 1/2011 | Zon |
| 2011/0040624 A1 | 2/2011 | Jhanji |
| 2011/0076992 A1 | 3/2011 | Chou et al. |
| 2011/0113360 A1 | 5/2011 | Johnson et al. |
| 2011/0172004 A1 | 7/2011 | Breitenbach et al. |
| 2011/0173041 A1 | 7/2011 | Breitenbach et al. |
| 2011/0173092 A1 | 7/2011 | Werbitt |
| 2011/0174879 A1 | 7/2011 | Morley |
| 2011/0184837 A1 | 7/2011 | Biro |
| 2011/0202463 A1 | 8/2011 | Powell |
| 2011/0238514 A1 | 9/2011 | Ramalingam et al. |
| 2011/0251910 A1 * | 10/2011 | Dimmick ............ G06Q 20/322 |
| | | 705/17 |
| 2011/0259957 A1 | 10/2011 | Tsai |
| 2011/0276419 A1 | 11/2011 | Johnson et al. |
| 2012/0005039 A1 | 1/2012 | Dorsey et al. |
| 2012/0016794 A1 | 1/2012 | Orr et al. |
| 2012/0061467 A1 | 3/2012 | Tang et al. |
| 2012/0062599 A1 | 3/2012 | Machida |
| 2012/0072350 A1 | 3/2012 | Goldthwaite et al. |
| 2012/0084177 A1 | 4/2012 | Tanaka et al. |
| 2012/0095906 A1 | 4/2012 | Dorsey et al. |
| 2012/0144329 A1 | 6/2012 | Sasaki |
| 2012/0209657 A1 | 8/2012 | Connolly |

(56) References Cited

U.S. PATENT DOCUMENTS

| | | | |
|---|---|---|---|
| 2012/0284671 A1 | 11/2012 | Bamford et al. | |
| 2012/0290421 A1 | 11/2012 | Qawami et al. | |
| 2012/0290422 A1 | 11/2012 | Bhinder | |
| 2012/0310744 A1 | 12/2012 | Kim et al. | |
| 2012/0310824 A1 | 12/2012 | Liberty | |
| 2012/0330769 A1 | 12/2012 | Arceo | |
| 2013/0020389 A1 | 1/2013 | Barnett | |
| 2013/0036051 A1 | 2/2013 | Giordano et al. | |
| 2013/0050250 A1 | 2/2013 | Brinda et al. | |
| 2013/0059598 A1 | 3/2013 | Miyagi et al. | |
| 2013/0110658 A1* | 5/2013 | Lyman | G06Q 20/327 705/18 |
| 2013/0111412 A1 | 5/2013 | Sura et al. | |
| 2013/0124413 A1 | 5/2013 | Itwaru | |
| 2013/0132274 A1 | 5/2013 | Henderson et al. | |
| 2013/0151419 A1 | 6/2013 | Hitchcock et al. | |
| 2013/0212017 A1 | 8/2013 | Bangia | |
| 2013/0238436 A1 | 9/2013 | Light et al. | |
| 2013/0248596 A1 | 9/2013 | Arora et al. | |
| 2013/0262306 A1 | 10/2013 | Ladha | |
| 2014/0015785 A1 | 1/2014 | Sato et al. | |
| 2014/0019367 A1* | 1/2014 | Khan | G06Q 20/425 705/16 |
| 2014/0052613 A1 | 2/2014 | Tavakoli et al. | |
| 2014/0052615 A1 | 2/2014 | Andersen | |
| 2014/0074743 A1 | 3/2014 | Rademaker | |
| 2014/0108173 A1 | 4/2014 | Cooper et al. | |
| 2014/0123072 A1 | 5/2014 | Bhowmick et al. | |
| 2014/0129356 A1 | 5/2014 | Jain et al. | |
| 2014/0143145 A1 | 5/2014 | Kortina et al. | |
| 2014/0156531 A1 | 6/2014 | Poon et al. | |
| 2014/0257877 A1 | 9/2014 | L'Heureux et al. | |
| 2014/0258132 A1 | 9/2014 | Swamy et al. | |
| 2014/0263630 A1 | 9/2014 | Richardson et al. | |
| 2014/0278609 A1 | 9/2014 | Capps | |
| 2014/0279185 A1 | 9/2014 | Merz et al. | |
| 2014/0310182 A1 | 10/2014 | Cummins | |
| 2014/0379582 A1 | 12/2014 | Caglayan et al. | |
| 2015/0019431 A1 | 1/2015 | Strasding et al. | |
| 2015/0031393 A1 | 1/2015 | Post et al. | |
| 2015/0046339 A1 | 2/2015 | Wong et al. | |
| 2015/0081532 A1 | 3/2015 | Lewis et al. | |
| 2015/0100488 A1 | 4/2015 | Dua | |
| 2015/0339648 A1 | 11/2015 | Kushevsky et al. | |
| 2015/0347999 A1 | 12/2015 | Lau et al. | |
| 2016/0232515 A1* | 8/2016 | Jhas | G06Q 20/3224 |
| 2017/0124567 A1 | 5/2017 | Henderson et al. | |
| 2019/0122201 A1 | 4/2019 | Tavakoli et al. | |

FOREIGN PATENT DOCUMENTS

| | | |
|---|---|---|
| JP | 2003-108777 A | 4/2003 |
| JP | 2006-139641 A | 6/2006 |
| JP | 2006-179060 A | 7/2006 |
| JP | 2006-308438 A | 11/2006 |
| WO | 02/084548 A1 | 10/2002 |
| WO | 2011014875 A1 | 2/2011 |

OTHER PUBLICATIONS

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Non-Final Office Action dated Aug. 7, 2015, for U.S. Appl. No. 14/066,459, of Perito, D., et al., filed Oct. 29, 2013.

Final Office Action dated Jan. 21, 2016, for U.S. Appl. No. 14/066,459, of Perito, D., et al., filed Oct. 29, 2013.

Non-Final Office Action dated Mar. 29, 2016, for U.S. Appl. No. 14/066,459, of Perito, D., et al., filed Oct. 29, 2013.

Final Office Action dated Oct. 26, 2016, for U.S. Appl. No. 14/066,459, of Perito, D., et al., filed Oct. 29, 2013.

Advisory Action dated Feb. 6, 2017, for U.S. Appl. No. 14/066,459, of Perito, D., et al., filed Oct. 29, 2013.

Non-Final Office Action dated Aug. 8, 2017, for U.S. Appl. No. 14/066,459, of Perito, D., et al., filed Oct. 29, 2013.

Final Office Action dated Nov. 17, 2017, for U.S. Appl. No. 14/066,459, of Perito, D., et al., filed Oct. 29, 2013.

"2.5mm Headset Jack," Retrieved from the Internet URL: http://www.phonescoop.com/glossary/term.php?gid=360, on May 5, 2011, pp. 1-1.

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards-. . . , on Feb. 8, 2011, pp. 1-3.

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.

"Arduino magnetic stripe decoder," Instructables, Retrieved from the Internet URL: http://www.instructables.com/id/Arduino-magneticstripe-decorder/, on Feb. 8, 2011, pp. 1-5.

"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.

"Get paid on the spot from your mobile phone," Retrieved from the Internet URL: http://payments.intuit.com/products/basic-payment solutions/mobile-credit-card-processin . . . , on Feb. 11, 2011, pp. 1-3.

"Headphone Jack (3.5mm)," Retrieved from the Internet URL: http://www.phonescoop.com/glossary/term.php? gid=440, on May 5, 2011, pp. 1-1.

"Magnetic Card Reader," lekernel.net~scrapbook, Retrieved from the Internet URL: http://lekernel.net/scrapbook/old/cardreader.html, on Apr. 25, 2011, pp. 1-4.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.

"Magnetic stripe reader/writer," Retrieved from the Internet URL: http://www.gae.ucm.es/-padilla/extrawork/stripe.html, on Dec. 21, 2009, pp. 1-2.

"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.

"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.

"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.

"Pay@PC," Retrieved from the Internet URL: http://www.merchantanywhere.com/PAY_AT_PCT@PC.htm, on Feb. 11, 2011, pp. 1-2.

"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.

"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.

"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.

(56) References Cited

OTHER PUBLICATIONS

"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," dated Nov. 10, 2014, Retrieved from the internet URL: https://play.google.com/store/apps/details?id=com.ubercab&hl=en, on Nov. 12, 2014, pp. 2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Non-Final Office Action dated Nov. 16, 2018, for U.S. Appl. No. 15/408,300, of Henderson, W., et al., filed Jan. 17, 2017.
Justin, "Visa Enters The Location-Based Mobile Marketing Space With New iPhone App," dated Dec. 14, 2010, Retrieved from the internet URL: http://www.mobilemarketingwatch.com/visa-enters-the-location-based-mobile-marketing-space-with-new-iphone-app-11875/, on Feb. 23, 2015, p. 1.
Non-Final Office Action dated Jun. 22, 2012, for U.S. Appl. No. 13/088,032, of Dorsey, J., et al., filed Apr. 15, 2011.
Final Office Action dated Nov. 23, 2012, for U.S. Appl. No. 13/088,032, of Dorsey, J., et al., filed Apr. 15, 2011.
Non-Final Office Action dated Oct. 7, 2013, for U.S. Appl. No. 13/179,836, of Dorsey, J., et al., filed Jul. 11, 2011.
Non-Final Office Action dated Oct. 25, 2013, for U.S. Appl. No. 13/683,841, of Henderson, W., et al., filed Nov. 21, 2012.
Non-Final Office Action dated Jan. 30, 2014, for U.S. Appl. No. 13/612,731, of Tavakoli, S., et al., filed Sep. 12, 2012.
Non-Final Office Action dated May 29, 2014, for U.S. Appl. No. 14/017,247, of Henderson, W., et al., filed Sep. 3, 2013.
Non-Final Office Action dated Jun. 19, 2014, for U.S. Appl. No. 13/088,032, of Dorsey, J., et al., filed Apr. 15, 2011.
Non-Final Office Action dated Jul. 24, 2014, for Design U.S. Appl. No. 29/429,897, Andersen, R. et al., filed Aug. 17, 2012.
Final Office Action dated Nov. 5, 2014, for U.S. Appl. No. 13/612,731, of Tavakoli, S., et al., filed Sep. 12, 2012.
Non-Final Office Action dated Jan. 7, 2015, for U.S. Appl. No. 14/017,940, of Henderson, W., et al., filed Sep. 4, 2013.
Non-Final Office Action dated Jan. 9, 2015, for U.S. Appl. No. 14/498,975, of Varma, A.K., et al., filed Sep. 26, 2014.
Notice of Allowance dated Jan. 30, 2015, for U.S. Appl. No. 29/429,897, Andersen, R., et al., filed Aug. 17, 2012.
Non-Final Office Action dated Mar. 4, 2015, for U.S. Appl. No. 13/088,032, of Dorsey, J., et al., filed Apr. 15, 2011.
Non-Final Office Action dated Mar. 17, 2015, for U.S. Appl. No. 13/683,879, of Henderson, W., et al., filed Nov. 21, 2012.
Final Office Action dated Jul. 8, 2015, for U.S. Appl. No. 14/498,975, of Varma, A.K., et al., filed Sep. 26, 2014.
Non-Final Office Action dated Aug. 26, 2015, for U.S. Appl. No. 14/017,247, of Henderson, W., et al., filed Sep. 3, 2013.
Non-Final Office Action dated Aug. 27, 2015, for U.S. Appl. No. 14/017,940, of Henderson, W., et al., filed Sep. 4, 2013.
Non-Final Office Action dated Aug. 28, 2015, for U.S. Appl. No. 13/612,731, of Tavakoli, S., et al., filed Sep. 12, 2012.
Final Office Action dated Nov. 5, 2015, for U.S. Appl. No. 13/683,879, of Henderson, W., et al., filed Nov. 21, 2012.
Final Office Action dated Nov. 20, 2015, for U.S. Appl. No. 13/088,032, of Dorsey, J., et al., filed Apr. 15, 2011.
Final Office Action dated Feb. 12, 2016, for U.S. Appl. No. 14/017,940, of Henderson, W., et al., filed Sep. 4, 2013.
Ex parte Quayle Action dated Apr. 8, 2016, for U.S. Appl. No. 13/088,032, of Dorsey, J., et al., filed Apr. 15, 2011.
Non-Final Office Action dated Apr. 22, 2016, for U.S. Appl. No. 13/683,879, of Henderson, W., et al., filed Nov. 21, 2012.
Non-Final Office Action dated Apr. 22, 2016, for U.S. Appl. No. 14/498,975, of Varma, A.K., et al., filed Sep. 26, 2014.
Non-Final Office Action dated Apr. 22, 2016, for U.S. Appl. No. 13/683,841, of Henderson, W., et al., filed Nov. 21, 2012.
Final Office Action dated Apr. 27, 2016, for U.S. Appl. No. 14/017,247, of Henderson, W., et al., filed Sep. 3, 2013.
Notice of Allowance dated Jun. 16, 2016, for U.S. Appl. No. 13/088,032, of Dorsey, J., et al., filed Apr. 15, 2011.
Advisory Action dated Aug. 5, 2016, for U.S. Appl. No. 14/017,247, of Henderson, W., et al., filed Sep. 3, 2013.
Notice of Allowance dated Oct. 7, 2016, for U.S. Appl. No. 14/017,940, of Henderson, W., et al., filed Sep. 4, 2013.
Notice of Allowance dated Oct. 24, 2016, for U.S. Appl. No. 13/683,879, of Henderson, W., et al., filed Nov. 21, 2012.
Final Office Action dated Oct. 31, 2016, for U.S. Appl. No. 14/498,975, of Varma, A.K., et al., filed Sep. 26, 2014.
Final Office Action dated Nov. 3, 2016, for U.S. Appl. No. 13/683,841, of Henderson, W., et al., filed Nov. 21, 2012.
Notice of Allowance dated Nov. 30, 2016, for U.S. Appl. No. 14/017,940, of Henderson, W., et al., filed Sep. 4, 2013.
Notice of Allowance dated Dec. 27, 2016, for U.S. Appl. No. 14/017,247, of Henderson, W., et al., filed Sep. 3, 2013.

(56) References Cited

OTHER PUBLICATIONS

Advisory Action dated Feb. 23, 2017, for U.S. Appl. No. 13/683,841, of Henderson, W., et al., filed Nov. 21, 2012.
Final Office Action dated Mar. 3, 2017, for U.S. Appl. No. 13/612,731, of Tavakoli, S., et al., filed Sep. 12, 2012.
Examiner's Requisition for Canadian Patent Application No. 2,777,885, dated Apr. 5, 2017.
Non-Final Office Action dated May 1, 2017, for U.S. Appl. No. 14/498,922, of Varma, A.K., et al., filed Sep. 26, 2014.
Notice of Allowance dated Jun. 20, 2017, for U.S. Appl. No. 14/498,975, of Varma, A.K., et al., filed Sep. 26, 2014.
Non-Final Office Action dated Jul. 10, 2017, for U.S. Appl. No. 14/498,876, of Varma, A.K., et al., filed Sep. 26, 2014.
Non-Final Office Action dated Jul. 13, 2017, for U.S. Appl. No. 14/498,912, of Varma, A.K., et al., filed Sep. 26, 2014.
Advisory Action dated Jul. 13, 2017, for U.S. Appl. No. 13/612,731, of Tavakoli, S., et al., filed Sep. 12, 2012.
Non-Final Office Action dated Aug. 11, 2017, for U.S. Appl. No. 13/683,841, of Henderson, W., et al., filed Nov. 21, 2012.
Final Office Action dated Aug. 16, 2017, for U.S. Appl. No. 14/498,922, of Varma, A.K., et al., filed Sep. 26, 2014.
Final Office Action dated Nov. 22, 2017, for U.S. Appl. No. 14/498,912, of Varma, A.K., et al., filed Sep. 26, 2014.
Notice of Allowance dated Dec. 11, 2017, for U.S. Appl. No. 14/498,876, of Varma, A.K., et al., filed Sep. 26, 2014.
Non-Final Office Action dated Dec. 15, 2017, for U.S. Appl. No. 14/498,922, of Varma, A.K., et al., filed Sep. 26, 2014.
Non-Final Office Action dated Jan. 19, 2018, for U.S. Appl. No. 13/612,731, of Tavakoli, S., et al., filed Sep. 12, 2012.
Advisory Action dated Jan. 30, 2018, for U.S. Appl. No. 14/498,312, of Varma, A.K., et al., filed Sep. 26, 2014
Examiner's Requisition for Canadian Patent Application No. 2,777,885, dated Mar. 9, 2018.
Final Office Action dated Apr. 2, 2018, for U.S. Appl. No. 13/683,841, of Henderson, W., et al., filed Nov. 21, 2012.
Notice of Allowance dated Apr. 5, 2018, for U.S. Appl. No. 14/498,912, of Varma, A.K., et al., filed Sep. 26, 2014.
Notice of Allowance dated Apr. 27, 2018, for U.S. Appl. No. 14/498,922, of Varma, A.K., et al., filed Sep. 26, 2014.
Adractas, M., et al., "The road to mobile payments services," McKinsey on Payments, pp. 45-52 (Sep. 2011).
Notice of Allowance dated Aug. 8, 2018, for U.S. Appl. No. 14/498,922, of Varma, A.K., et al., filed Sep. 26, 2014.
Final Office Action dated Aug. 16, 2018, for U.S. Appl. No. 13/612,731, of Tavakoli, S., et al., filed Sep. 12, 2012.
Notice of Allowance dated Sep. 7, 2018, for U.S. Appl. No. 13/683,841, of Henderson, W., et al., filed Nov. 21, 2012
Barnes, "Location-Based Services," Victoria University of Wellington, 2003, 14 pages.
Rustamov, "Payments papers, Directions in the development of the payment service market," Central Bank of the Republic of Azerbaijamn, Payment Systems and Settlements Department, AZ1014, 32, R. Behbudov str., Baku Azerbaijan, 2016, 14 pages.
Notice of Allowance dated Nov. 7, 2019, for U.S. Appl. No. 15/408,300, of Henderson, W., et al., filed Jan. 17, 2017.
Notice of Allowance for Canadian Patent Application No. 2,777,885, dated Feb. 19, 2019.
Ex Parte Quayle Action mailed Jun. 17, 2019, for U.S. Appl. No. 15/408,300, of Henderson, W., et al., filed Jan. 17, 2017.
Non-Final Office Action dated Jun. 10, 2020, for U.S. Appl. No. 16/193,227, of Tavakoli, S., et al., filed Nov. 16, 2018.

\* cited by examiner

DISCOVERY AND COMMUNICATION USING DIRECT RADIO SIGNAL COMMUNICATION

CROSS-REFERENCE TO RELATED APPLICATIONS

This application is a continuation of U.S. application Ser. No. 14/066,459, filed on Oct. 29, 2013, entitled, "DISCOVERY AND COMMUNICATION USING DIRECT RADIO SIGNAL COMMUNICATION"; which is hereby expressly incorporated herein by reference in its entirety.

BACKGROUND

This specification relates to wireless communication between devices.

A mobile user device can communicate over a network, e.g., the Internet, with a payment service system to provide information about a current geographic location of the mobile device. In response, a payment service system can provide the user device, by communicating over the network, a list of nearby merchants. The user device can further communicate, over the network, information that facilitates a purchase transaction with the merchant using the payment service system.

BRIEF DESCRIPTION OF THE DRAWINGS

Like reference numbers and designations in the various drawings indicate like elements.

DETAILED DESCRIPTION

Figure 1:
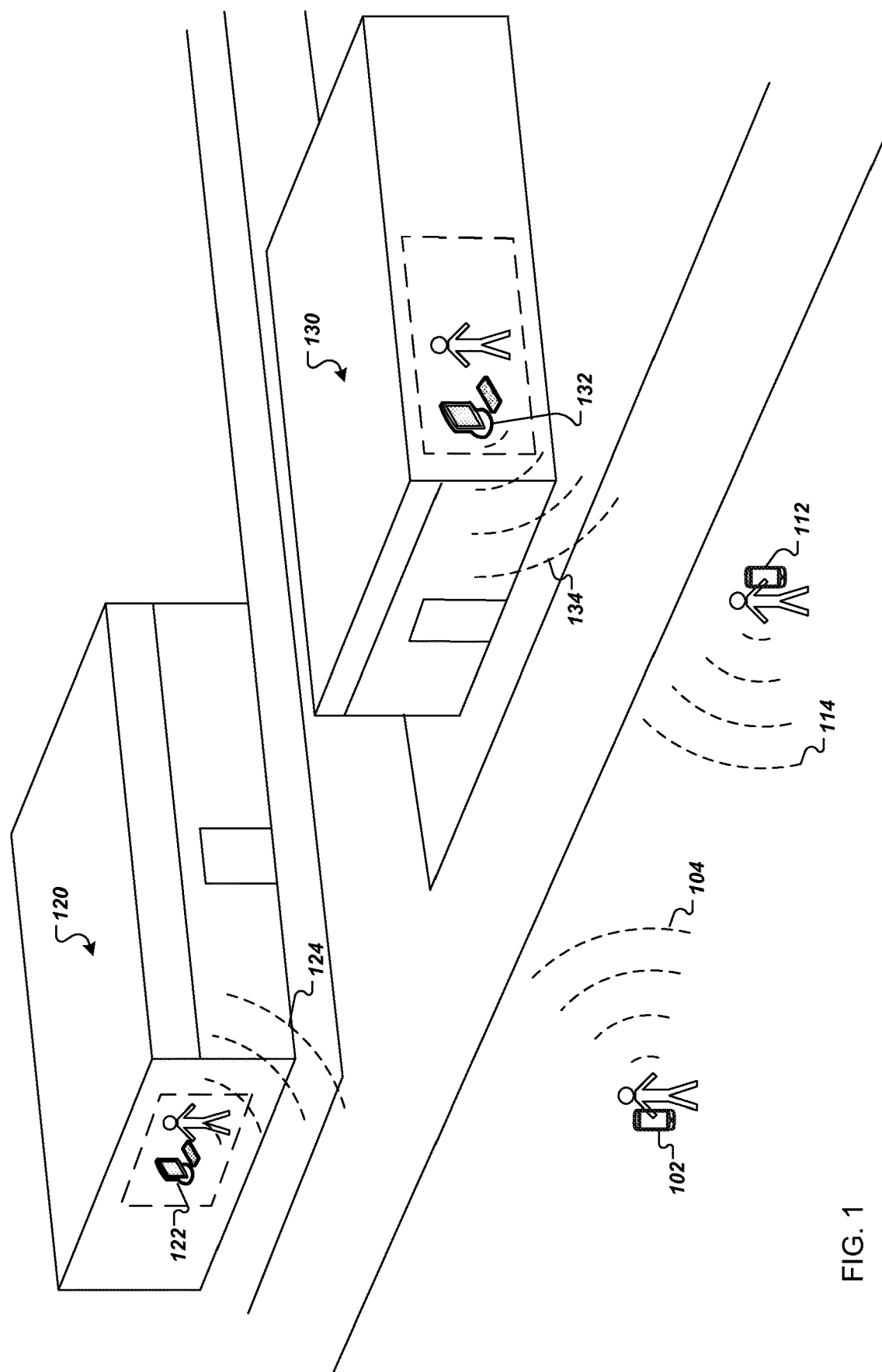
FIG. 1 illustrates using direct radio signal communication to discover and communicate securely with merchants and other user devices.

A user device can use direct radio signal communication to discover nearby merchants and nearby user devices and to securely exchange information with such nearby devices. The user device can use the secure information exchange using direct radio signal communication for a variety of purposes, e.g., to obtain information about a merchant or information about another user, to place an order with a merchant, or to effectuate a payment to the merchant or another user using a payment service system, to name a few examples. The user device can use the secure information exchange to have a third-party system verify the identity of a user to another device that has a connection with the third-party system.

The user device can use direct radio signal communication to communicate with a payment service system through a nearby merchant or another user device. For example, an otherwise "offline" user device, e.g., a user device that has deactivated its WiFi and cellular data transceiver, can effectuate a payment to a merchant using direct radio signal communications with the merchant device. The merchant device receives information encoded in the radio signals emitted by the user device and communicates with a payment service system to effectuate a payment transaction.

The discovery and secure communication protocols can allow an offline user device to communicate through nearby devices with a payment service system. To the nearby devices, the user of the user device remains anonymous, and the nearby device is never exposed to any sensitive information, e.g., a credit card number, or personally identifying information, e.g., the user's full name or address.

In this specification, direct radio signal communication refers to using mid-range to short range radio signal protocols to directly communicate information wirelessly to other devices. In other words, the devices can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short range radio communications having an operable range of at least 1 meter and up to about 50 meters, e.g., Bluetooth, Bluetooth 4.0, and Bluetooth Low Energy (BLE). The radio signals described in this specification can be any appropriate type of signal, e.g., a broadcast signal that indicates presence of the device to nearby devices, a pairing signal that requests automatic pairing with a nearby device, or a connection signal that transmits data to a connected nearby device, to name a few examples. In this specification, a device can be said to be "nearby" if the device is within the operable range for performing direct radio signal communication with a user device.

FIG. 1 illustrates using direct radio signal communication to discover and communicate securely with merchants and other user devices. A user device 102 in possession of a user emits radio signals 104, for example, as directed by an application installed on the user device 102. The user device 102 can repeatedly broadcast a message that indicates the presence of the user device 102 to other nearby devices, which will be referred to in this specification as a "Hello" message. The user device 102 can listen for an acknowledgement by receiving radio signals from nearby devices and detecting a message from a particular nearby device indicating that the nearby device received the "Hello" message from the user device 102.

For example, a merchant device 132 installed at a merchant place of business 130 can receive a "Hello" message encoded in the radio signal 104 emitted by the user device 102. In response, the merchant device 132 can use direct radio signal communication to send information about the merchant directly and wirelessly to the user device 102 using an emitted radio signal 134. Similarly, a merchant device 122 is installed at another merchant place of business 120 and emits a radio signal 124 that can communicate information about the merchant directly to the user device 102.

In addition, another user device 112 can receive the "Hello" message emitted by the user device 102. In response, the user device 112 can emit radio signals 114 to communicate information about the user device 112, e.g. an identifier, or information about the user in possession of the user device 112, e.g. a username, directly and wirelessly to the user device 102.

The radio signal communication protocols used by the devices to communicate the "Hello" message and other information can allow communication by the devices without requiring user input or requiring the user to participate in a pairing process. The protocols can thereby allow the user device to discover and communicate with any appropriately configured nearby device capable of communicating with such direct radio signal communication protocols.

In addition, the user device 102 can receive the information about a merchant or another user device as an alternative to receiving information over other wired or wireless communications networks that require intermediary devices, e.g., a wireless cellular network or a Wi-Fi network. Thus, an otherwise "offline" user device 102 that is not configured to communicate over such other wireless communication networks can still receive information from nearby merchant devices and other user devices using direct radio signal communication.

The user device 102 can use such direct radio signal communication to discover nearby merchants and to obtain information about such nearby merchants.

Figure 2A:
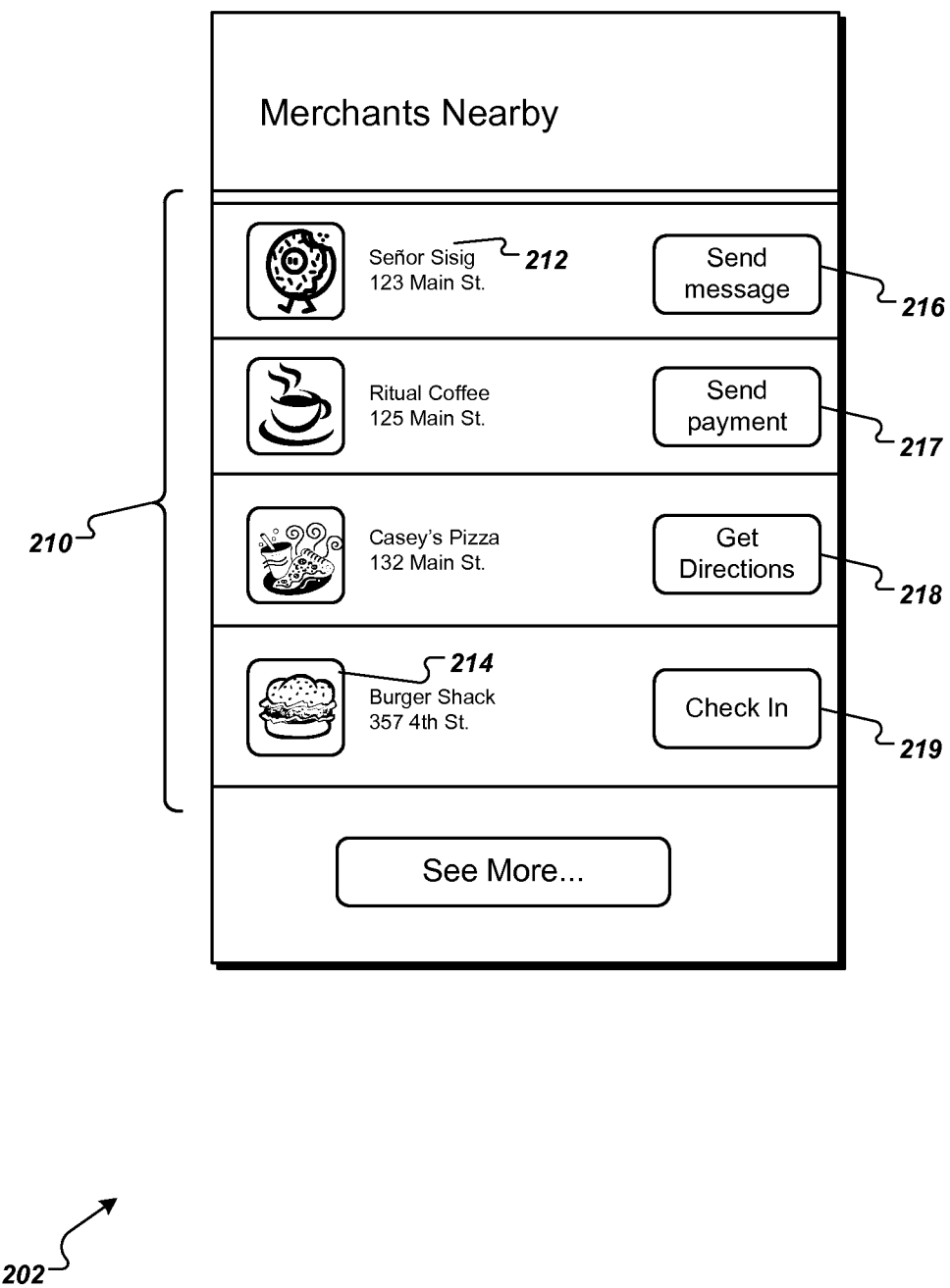
FIGS. 2A-2B are diagrams of example views of a user interface of a user application installed on a mobile user device.

FIG. 2A is a diagram of an example view of a user interface 202 of a user application installed on a mobile user device. A user can use the example interface 202 shown in FIG. 2A to discover and communicate with nearby merchants devices. The information can be gathered by the user application installed on the user device using direct radio signal communication protocols that allow the user device to discover and obtain information about merchants from nearby merchant devices associated with the merchants.

Thus, an otherwise offline user device can obtain the information illustrated in FIG. 2A by communicating directly with nearby merchant devices. However, the application installed on the user device need not obtain such merchant information solely from direct radio signal communication. Instead, the application can obtain the merchant information shown in FIG. 2 by communicating with a server over a network, e.g., the Internet. For example, the application can obtain a merchant identifier using direct radio signal communication with a merchant device. The application can then provide the merchant identifier to a server over the Internet and can receive merchant information from the server in response to the identifier.

The interface 202 presents a list 210 of nearby merchants on a display device of the mobile user device. The list 210 can be organized into a plurality of rows, with each row including a name of the merchant 212 and a merchant icon 214. Each row may also include other information, e.g., a distance from a current location of the user device to the merchant. In some implementations, the application presents only merchants that have been authenticated using the authentication process described below with reference to FIG. 4.

User selection of any of the rows in the list 210 can cause the application to retrieve and present more information about the selected merchant. For example, the application can obtain merchant hours of operation, directions, menus, or additional contact information, to name a few examples.

The example interface 202 can include a variety of options for interacting with the nearby merchants using direct radio signal communication. For example, a row can include a "Send message" option 216 for sending a message to a nearby merchant, a "Send payment" option 217 for initiating a payment to the merchant using a payment service system in communication with a merchant device of the merchant, a "Get directions" option 218 for receiving directions to the merchant's place of business, and a "Check In" option 219 that authorizes the merchant to conduct a transaction with an account of the user with a payment service system. Each of these options can cause a user application installed on the mobile device to use direct radio signal communication with a nearby merchant device associated with the corresponding merchant to effectuate the operation.

Figure 2B:
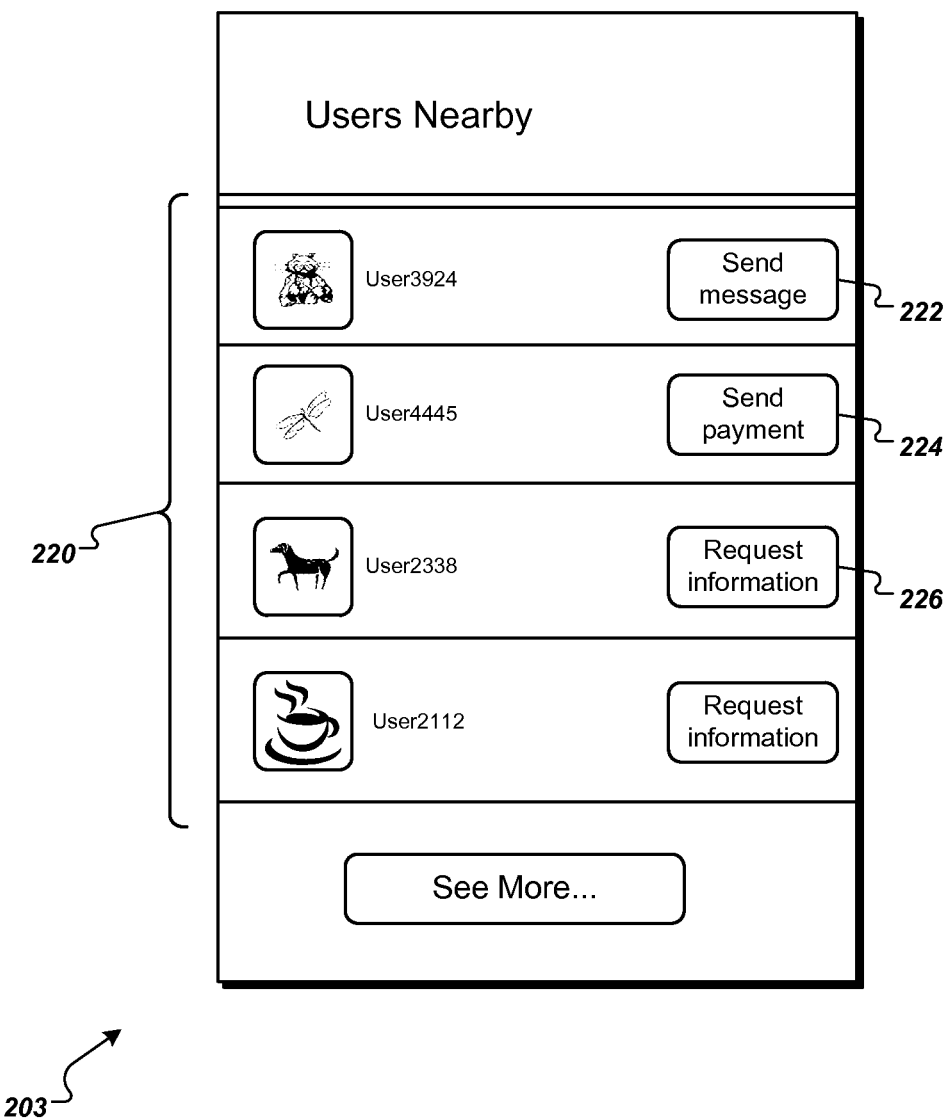

FIG. 2B is a diagram of an example view of a user interface 203 of a user application installed on a mobile user device. A user can use the example interface 203 shown in FIG. 2B to discover and communicate with nearby user devices. The information shown in FIG. 2B can be gathered by the user application installed on the user device using direct radio signal communication protocols that allow the user device to discover nearby user devices and obtain information about the nearby user devices.

The interface 203 presents a list 220 of nearby user devices on a display device of the mobile user device. The list 220 can be organized into a plurality of rows, with each row including an identifier of the user and a user icon. In some implementations, the application presents only users that have been authenticated using the authentication process described below with reference to FIG. 4.

The example interface 203 can include a variety of options for interacting with the nearby users using direct radio signal communication. For example, a row can include a "Send message" option 222 for sending a message to a nearby user, a "Send payment" option 224 for initiating a payment to the user using a payment service system in communication with a nearby device of the user, and a "Request information" option 219 for requesting more information about the user from a corresponding nearby user device. Each of these options can cause a user application installed on the mobile device to use direct radio signal communication with a nearby user device associated to effectuate the operation.

Figure 3A:
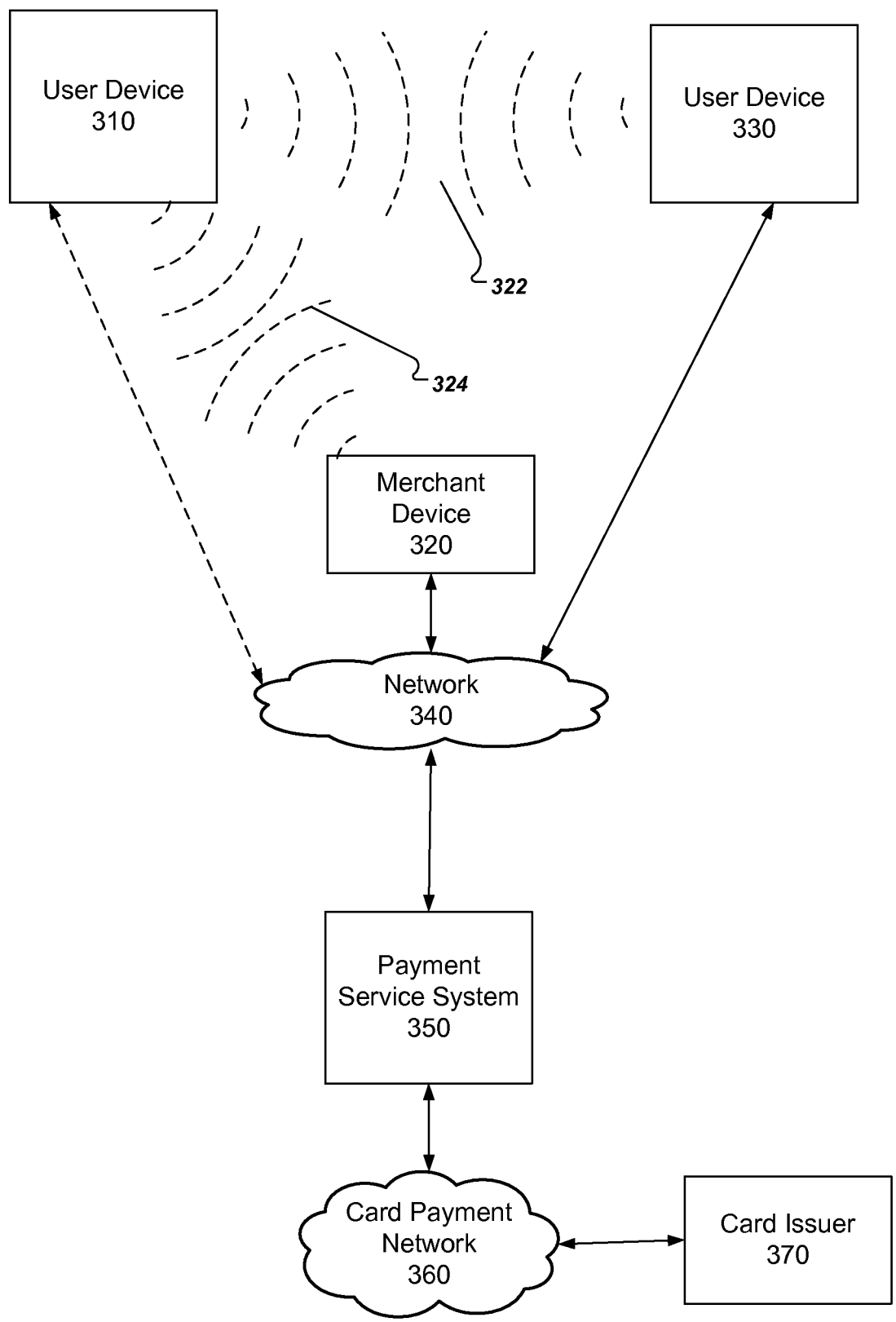
FIG. 3A is a block diagram of an example system.

FIG. 3A is a block diagram of an example system. The example system includes a user device 310, a user device 330, and a merchant device 320. The user device 310 can communicate with both the user device 330 and the merchant device 320 using direct radio signal communication with radio signals 322 and 324. The merchant device 320 and the user device 330 can communicate with a payment service system 350 over a network 340. The network 340 can be a wireless cellular network, a wireless local area network, a Wi-Fi network, a mobile telephone or another telecommunications network, a wired Ethernet network, a private network such as an intranet, a public network such as the Internet, or any appropriate combination of such networks. The user device 310 may or may not be configured to communicate with the payment service system 350 over the network 340.

The payment service system 350 can communicate with a payment card issuer 370 over a card payment network 360 to effectuate purchase transactions between a user associated with the user device 310 and a merchant associated with the merchant device 320, or between a user associated with the user device 310 and a user associated with the user device 330.

Figure 3B:
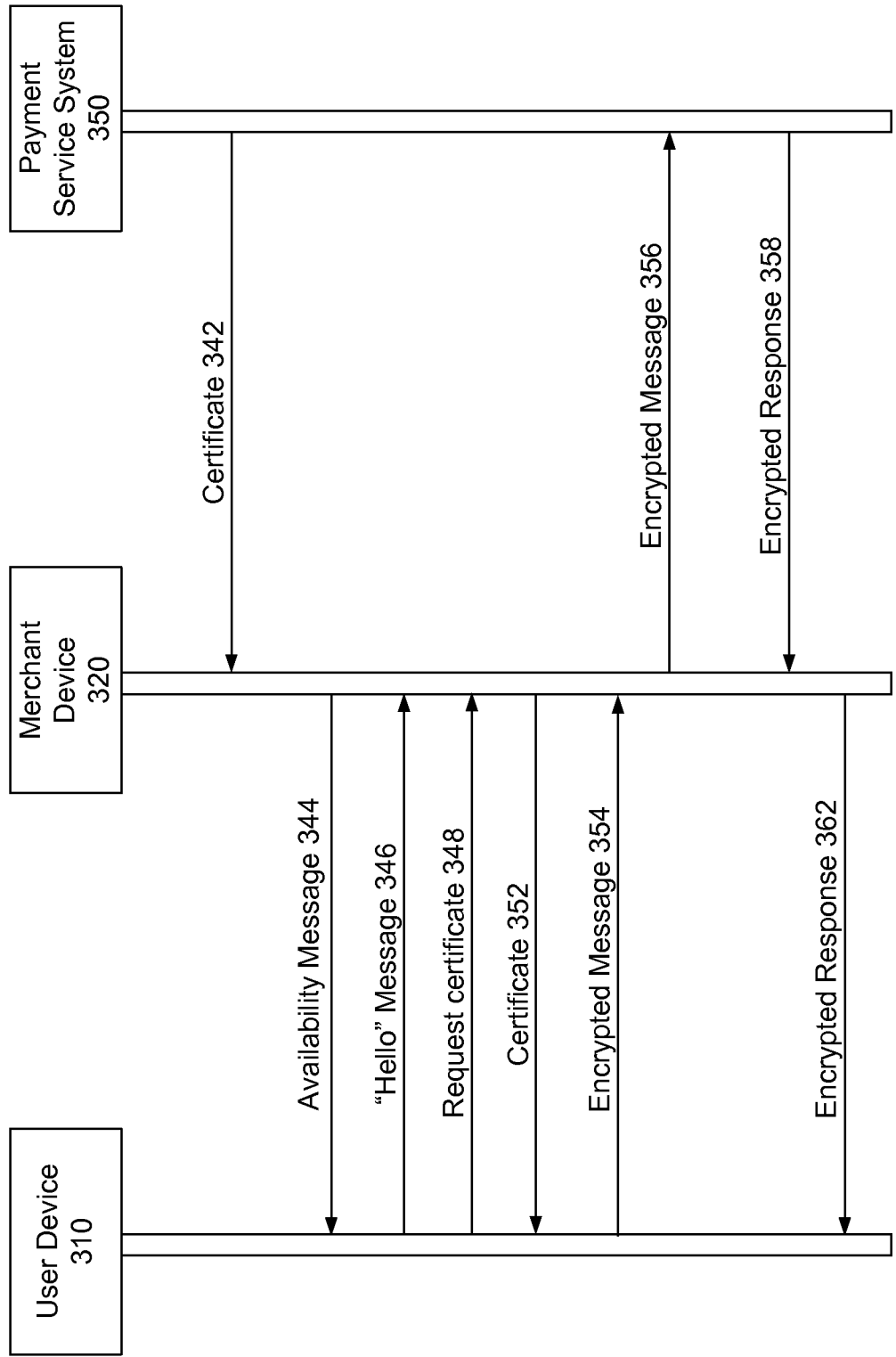
FIG. 3B is a sequence diagram illustrating discovery and communication protocols.

FIG. 3B is a sequence diagram illustrating discovery and communication protocols. The payment service system 350 can issue certificates that allow user devices to authenticate nearby merchant and other user devices. The communication functionality can be implemented by a user application installed on the user device 310 and a merchant application installed on the merchant device 320. The applications may also be maintained and distributed by the payment service system 350, e.g., downloaded onto the user device 310 or merchant device 320 from a server of the payment service system 350, or the devices can obtain the applications through another channel, e.g., a third-party online store.

The payment service system 350 can issue a certificate to the merchant device 320 (342). The certificate can include a digital signature that the user device 310 can verify using a public key of the payment service system 350. The user device 310 can obtain or update the public key of the payment service system 350 by communicating over a network, or the user device can obtain the public key of the payment service system 350 as part of the installation process for the user application installed on the user device 310.

The user device 310 can use a discovery protocol to discover nearby merchant devices or other user devices using direct radio signal communication. For example, the merchant device 320 can repeatedly emit an availability message (344) that advertises the availability of the merchant device 320 to engage in radio signal communication with nearby devices. To establish a connection with the merchant device 320, the user device 310 can emit a "Hello" message (346). The "Hello" message can initiate an automatic pairing process with the merchant device 320 in which one or more packets are exchanged between the devices in order to set up direct radio signal communication between the devices.

The user device 310 requests a certificate from the merchant device 320 (348). The merchant device 320 responds to the certificate request by providing the certificate 346 received from the payment service system 350 (352). In some implementations, nearby devices that receive the "Hello" message 346 from the user device 310 can respond by automatically providing a certificate received from the payment service system 350, which the user device can use to authenticate the nearby devices.

After authenticating the merchant device 320 using the received certificate and the public key of the payment service system 350, the user device 310 can engage in a secure communication protocol with the merchant device 320 using direct radio signal communication. For example, the user device 310 can send an encrypted message to the merchant device 320 using direct radio signal communication (354).

The merchant device 320 can forward the encrypted message to the payment service system 350 (356). The payment service system 350 can then decrypt and act on the message.

For example, the encrypted message 352 can include an authorization for a merchant associated with the merchant device 320 to initiate a payment transaction using the payment service system 350. The payment service system 350 can then communicate with the merchant device 320 to provide personal identifying information of the user to the merchant device 320. In some implementations, the personal identifying information includes the user's name and picture. Upon receipt of this information, the merchant device 320 displays the user's identifying information on the graphical user interface (GUI) of the merchant application. In some implementations, through the GUI of the merchant application, a user of the merchant device 320 can select items that the user has sought to purchase. The merchant application can be configured to associate individual prices with each of the merchant's items, and the application can automatically sum the total transaction amount that the user owes. In some implementations, the user of the merchant device 320 can enter into the merchant application a total sum of prices for all the items the user wishes to purchase, as well as tax or tip. A user can authorize payment for a transaction by verbally notifying the user of the merchant device 320. For example, a user named John Smith can tell the user of the merchant device 320, "Put this on John Smith." Before or after the user authorizes payment for the transaction, the user of the merchant device 320 can verify the user's identity. For example, the user of the merchant device 320 can ensure that the image displayed on the merchant device matches the user who is present in person. Assuming that the image matches, the user of merchant device 320 can select the transaction using the GUI of the merchant application. The user of the merchant device 320 can also ask the user for more identifying information before processing the transaction such as the user's birthday, address, or other personal identifying information. After verifying the user's identity, the user of the merchant device 320 interfaces with the merchant application to start processing the transaction.

The payment service system 350 can then generate and send an encrypted response to the merchant device 320 (358), and the merchant device 320 can forward the encrypted response back to the user device 310 using direct radio signal communication (362). For example, the encrypted response 356 can include a message "Payment successful," or the encrypted response 356 can include a receipt listing items purchased that the user application can present on a display of the user device 310.

Figure 4:
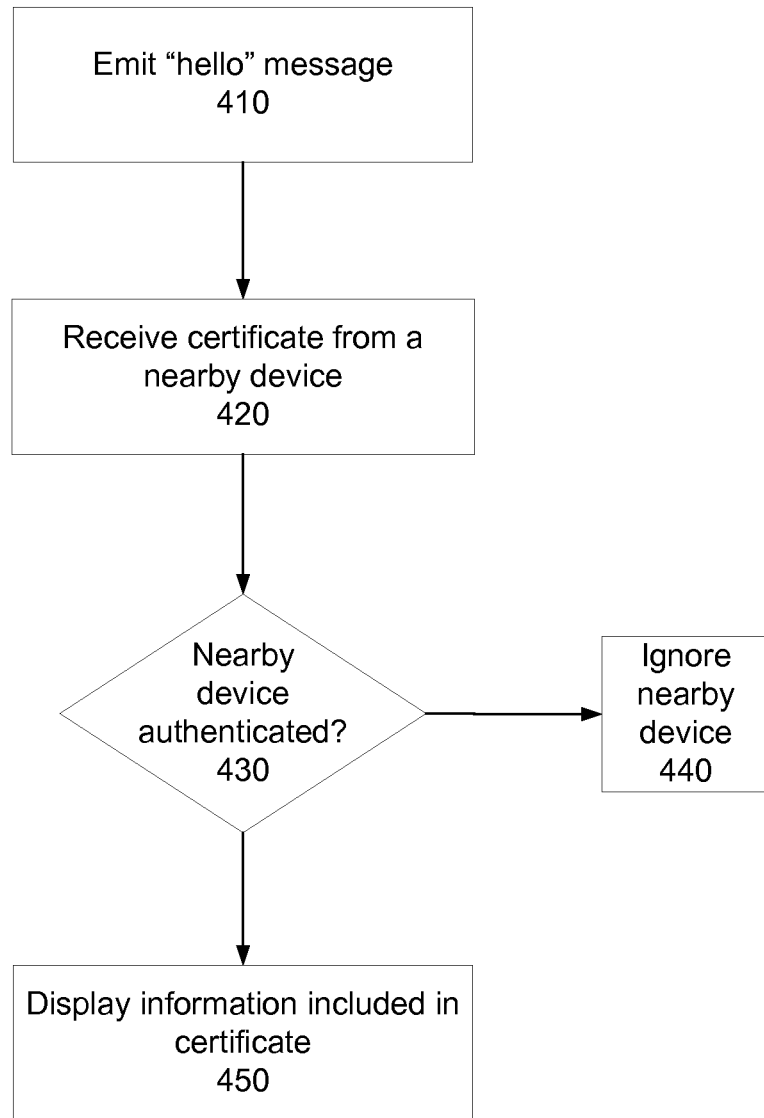
FIG. 4 is a flow chart of an example process for authenticating nearby merchant devices and other user devices using direct radio signal communication.

FIG. 4 is a flow chart of an example process for authenticating nearby merchant devices and other user devices using direct radio signal communication. In general, a user device emits a "Hello" message encoded in a radio signal. A nearby device, e.g., a merchant device or another user device, receives the "Hello" message and responds by providing the user device with a certificate. The user device can then authenticate the other device using the certificate and can thereafter decide to establish secure communication with the other device. The example process can be implemented by one or more computer programs installed on one or more computers. The process will be described as being performed by an appropriately programmed user device, e.g., the user device 310 of FIG. 3.

The user device emits a "Hello" message (410). The user device can emit the "Hello" message in response to receiving a message from a merchant device indicating the availability of the merchant device. In some implementations, the user device can repeatedly emit a "Hello" message, for example, as functionality of an application or an operating system installed on the user device. The user device can continue to broadcast the "Hello" message while the application installed on the user device is running in the background, in other words, when the application is not an application currently engaged by the user.

The "Hello" message can have any appropriate format established by the discovery protocol. For example, the "Hello" message can include information that identifies only a protocol type, a protocol version number, or both. In some implementations, the user device broadcasts a "Hello" message that does not include any personally identifying information about the user device or the user.

Other nearby devices can listen for radio signals that encode "Hello" messages having an established format. The nearby devices can be appropriately programmed, e.g., as functionality of an application or an operating system installed on the devices, to treat messages having the established discovery protocol format as requests to establish secure communication for exchanging information with the listening devices.

The user device receives a certificate from a nearby device (420). In some implementations, the user device first sends a message to the nearby device that requests the certificate. Certificates can be generated by a central authority, e.g., a payment service system that maintains information about merchants and other users. The nearby devices can communicate with the central authority to obtain a certificate, e.g., by communicating over the Internet. The nearby devices can then forward the received certificate to the user device using direct radio signal communication in response to a received "Hello" message. Alternatively, a nearby device can provide an identifier to the user device using direct radio signal communication. The user device can then communicate over a network to provide the identifier to the central authority to obtain a certificate for the nearby device that provided the identifier.

In some implementations, the certificate includes information about a user or a merchant associated with the nearby device, e.g., a name of an associated merchant or user. The user application can display the information received in the certificate on a display of the user device, e.g., as illustrated in FIGS. 2A-2B. The content of the certificates may vary depending on whether the nearby device is associated with a merchant or is another user device.

For example, a payment service system can generate, for a merchant device associated with a merchant, a merchant certificate that includes a protocol version number, a server public key version number, a merchant identifier, a merchant name, a merchant category code, and a digital signature. For a user device associated with a user, the payment service system can generate a certificate that includes a protocol version number, a server public key version number, a user identifier, a user name, a category code that indicates that the device belongs to a user as opposed to a merchant, and a digital signature.

The payment service system can maintain a current protocol version number and refuse requests to communicate with devices using an older protocol. For example, the payment service system can require devices to upgrade their software to use a new protocol version.

The user device determines whether the nearby device is authenticated using the received certificate (430). The received certificate can include information that the user device can use to authenticate the nearby device. Authenticating the nearby device means verifying that the nearby device is actually associated with a merchant or a user indicated by the information in the received certificate.

To authenticate the nearby device, the user device can use any appropriate authentication mechanism operating on a digital signature included in the certificate. In some implementations, the user device uses public-key encryption techniques to authenticate the nearby device.

For example, when issuing a certificate to a merchant or a user, the payment service system can compute a message digest of one or more items of merchant or user information, e.g. using an appropriate hashing algorithm. In some implementations, the payment service system computes a message digest using the merchant or user identifier, merchant or user name, and the merchant or user category code. The payment service system then uses a private key to encrypt the message digest into a digital signature to be included in the certificate issued to the merchant or the user.

The user device can compute a corresponding message digest from the one or more items of merchant or user information included in the certificate. The user device can then decrypt the digital signature using a public key of the payment service system and compare the result to the message digest computed by the user device. Encryption and decryption of the message digest can be performed using any appropriate digital signature algorithm, e.g. RSA probabilistic signature scheme (RSA-PSS) or elliptic curve digital signature algorithm (ECDSA).

If the user device is online, the user device can obtain the public key of the payment service system by communicating with the payment service system over a network, e.g., the Internet. If the user device is offline, the user device can obtain a public key of the payment service system that is stored as part of the user application installed on the user device. In some implementations, the user device may need to occasionally update the public key of the payment service system stored with the user application.

If the message digests do not match, the user device can ignore the nearby device (branch to 440). For example, the user device can thereafter decline messages received from the nearby device because it was not authenticated and may therefore be fraudulent.

If the message digests match, the user device can display the merchant or user information included in the certificate (branch to 450). For example, the user device can display the information in the certificate as part of a display of nearby merchants as illustrated in FIG. 2A. If the user device is online, the user device can communicate with the payment service system to obtain additional information the authenticated nearby merchant. The user device can also display the information in the certificate as part of a display of nearby users as illustrated by FIG. 2B.

Figure 5:
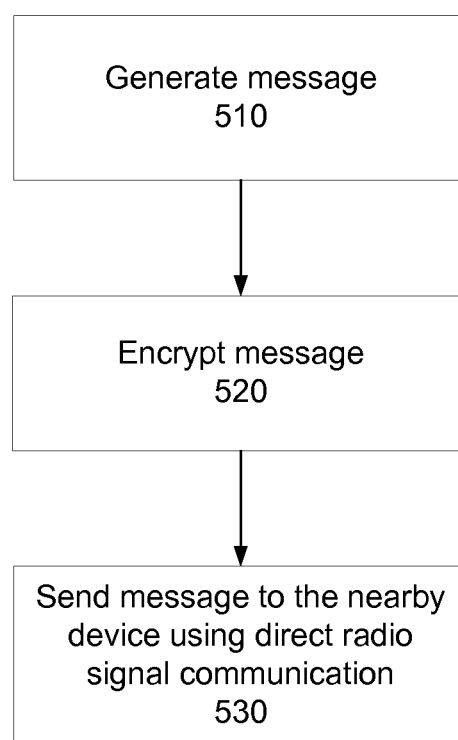
FIG. 5 is a flow chart of an example process for sending a message using direct radio signal communication.

FIG. 5 is a flow chart of an example process for sending a message using direct radio signal communication. The example process in FIG. 5 can be used by an offline user device to send a message to a payment service system, e.g., to conduct a payment transaction with a merchant device in communication with a payment service system. The example process can be implemented by one or more computer programs installed on one or more computers. The process will be described as being performed by an appropriately programmed user device, e.g., the user device 310 of FIG. 3.

The user device generates a message (510). The user device can generate a message to be sent to an authenticated nearby device using direct radio signal communication and forwarded by the nearby device to a payment service system. The message can include information that the payment service system will use to process the payment transaction.

In some implementations, the message includes a previously generated session token after authenticating the user of the user device with the payment service system. The payment service system can use a received session token to verify that the user associated with the user device is authorized to conduct the payment transaction. The message can also include a timestamp, a description of the request, e.g. "pay merchant" or "open a tab," and the message digest from the certificate received from the nearby device.

The user device encrypts the message (520). The user device can encrypt the message using a public key of the payment service system. As described above, the public key can be stored as part of a user application installed on the user device or obtained over a network if the user device is online. The user device can use any appropriate encryption algorithm to encrypt the message, e.g., elliptical curve integrated encryption scheme (ECIES) or RSA optimal asymmetric encrypting padding (RSA-OAEP).

The user device sends the message to the nearby device using direct radio signal communication (530). Because the message is encrypted, the nearby merchant or user device will not have access to any sensitive or personally identifying information associated with the user of the user device. After receiving the encrypted message, the nearby merchant or user device forwards the message to the payment service system over a network, e.g. the Internet.

Figure 6:
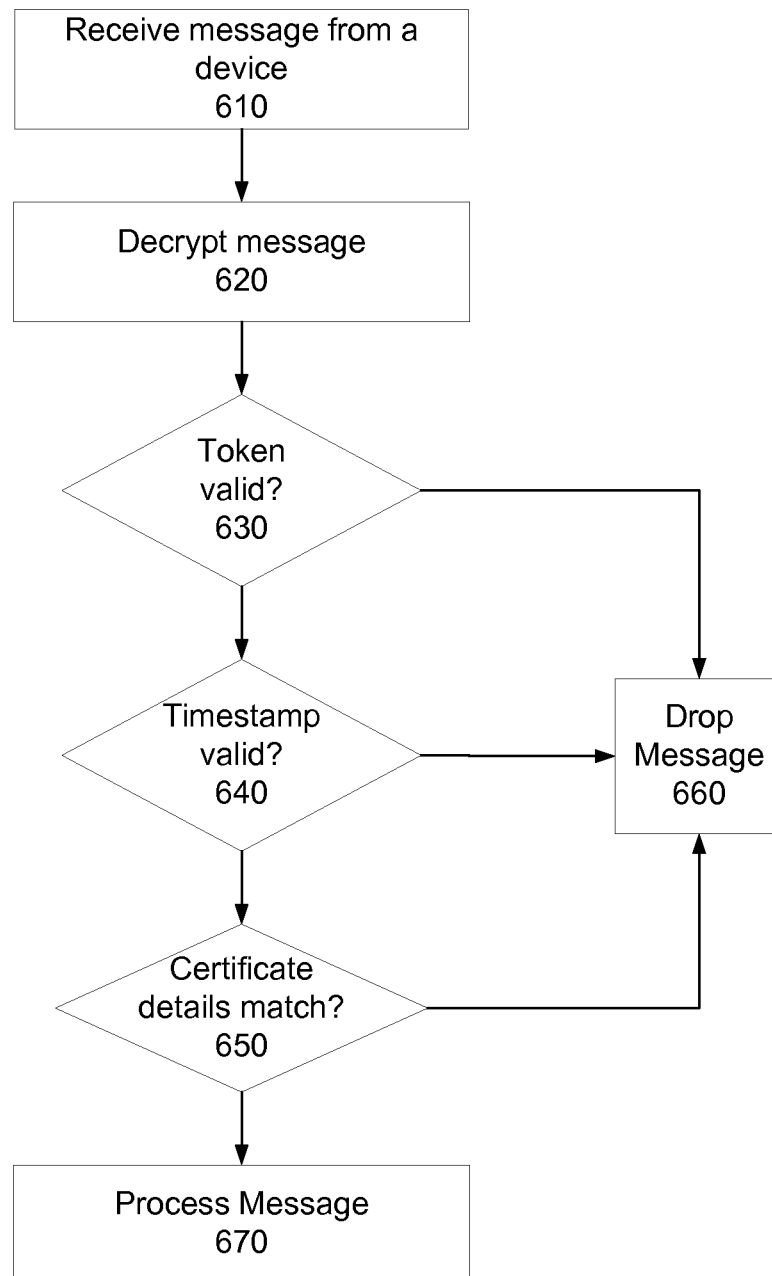
FIG. 6 is a flow chart of an example process for processing a message sent to a system from a user device.

FIG. 6 is a flow chart of an example process for processing a message sent to system from a user device. In general, the user device encrypts a message and sends the message to a nearby device using direct radio signal communication. The nearby device forwards the message to a payment service system for processing. The payment service system can decrypt the message, verify the sending of the message, and provide an encrypted response.

The example process can be implemented by one or more computer programs installed on one or more computers. The process will be described as being performed by an appropriately programmed system of one or more computers, e.g., the payment service system 350 of FIG. 3.

The system receives an encrypted message from a device (610). The message can be a messaged forwarded by a merchant or another user device that is near a user device from which the message originated. The user device can send the encrypted message to the nearby device using direct radio signal communications, and the nearby device can forward the encrypted message to the system over any appropriate communications network, e.g., the Internet.

The system decrypts the message (620). The system can decrypt the message using a private key of an appropriate encryption algorithm, e.g., ECIES or RSA-OAEP. The system can then analyze one or more items of information in the decrypted message to verify its validity. In some implementations, the decrypted message includes a token, a timestamp, and certificate details. The certificate details can include the same or similar information as the merchant or other user device information that was included in the certificate described above with reference to FIG. 4. In some implementations, the certificate details are encrypted within the encrypted message, e.g., included in the message as a message digest.

The system determines whether the token in the message is valid (630). The system can use a token in in the decrypted message to determine whether the user of the user device that generated the message is authenticated to perform transactions with the payment service system. If the system does not have a matching stored token, the system can drop the message (branch to 660). In other words, the system will not act on a request in the message and may or may not provide a response back to the device that forwarded the encrypted message.

The system determines whether the timestamp is valid (630). The system can determine that a timestamp is valid if it is within a particular allowed time window, e.g., sent within the previous 5, 10, or 20 minutes. The system can also use the timestamp to detect duplicate messages. Thus, the system can determine that the timestamp is valid if no messages associated with the user device have already been received having the same timestamp. If the timestamp is invalid, the system can drop the message (branch to 660).

The system determines whether the certificate details match (650). As an added layer of verification, the system can compare the certificate details to stored details about the merchant or user device that forwarded the message. If the certificate details have been forwarded as an encrypted message digest, the system can compute its own message digest of the relevant merchant tor user device information and compare the computed message digest to the received message digest. If the certificate details do not match, the system can drop the message (branch to 660).

In some implementations, if the user device received details about the merchant over a trusted channel with the system, e.g., Hypertext Transfer Protocol Secure (HTTPS), the user device can set the certificate details to a special reserved code, e.g., "0000" that causes the system to omit the check on the certificate details.

The system processes the message (670). For example, the message includes an authorization for a merchant to conduct a payment transaction using an account of the user, the system can communicate with the merchant device to conduct the transaction, as described above with reference to FIG. 3B.

Figure 7:
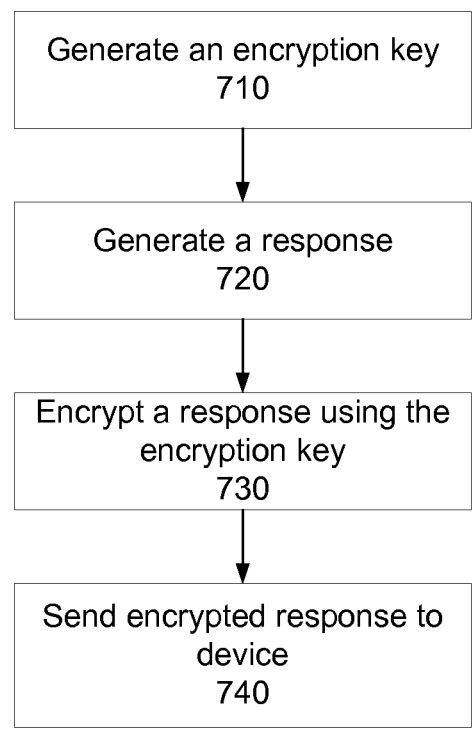
FIG. 7 is a flow chart of an example process for generating an encrypted response

FIG. 7 is a flow chart of an example process for generating an encrypted response. In general, a payment service system can generate an encrypted response to be sent to a user using an encryption key generated from a session token of the user. The example process can be implemented by one or more computer programs installed on one or more computers. The process will be described as being performed by an appropriately programmed system of one or more computers, e.g., the payment service system 350 of FIG. 3.

The system generates an encryption key (710). The system can use the session token provided by the user device in the encrypted message to generate a symmetric encryption key for encrypting the response sent back to the user device. Thus, when the user device receives the encrypted message, the user device can use the same session token to regenerate the same symmetric encryption key to decrypt the message from the system. In some implementations, the system uses a keyed-hash message authentication code (HMAC) algorithm to generate an encryption key from the session token. In some implementations, the system also uses one or more additional reserved strings, e.g., "User Device Encryption Code" as input to the algorithm that generates the encryption key.

The system generates a response (720). The system can generate a response that includes a message or other information, e.g., a receipt, to the user device, e.g., "Tab open successful" or "Error—not authorized," The response can also include the original timestamp that the user device included in the original message. The user device can use the timestamp provided in the response to determine whether to accept the response from the system as genuine.

The system encrypts the response using the generated encryption key (730). The system can use any appropriate symmetric key encryption algorithm to encrypt the generated response, e.g., Advanced Encryption Standard with counter with cipher block chaining message authentication code (AES-CCM).

The system sends the encrypted response to a user device (740). For example, the system can communicate with a merchant or other user device to provide the encrypted message to be forwarded to a user device using direct radio signal communication. In the case of online user device, the system can provide the encrypted message over a network.

Figure 8:
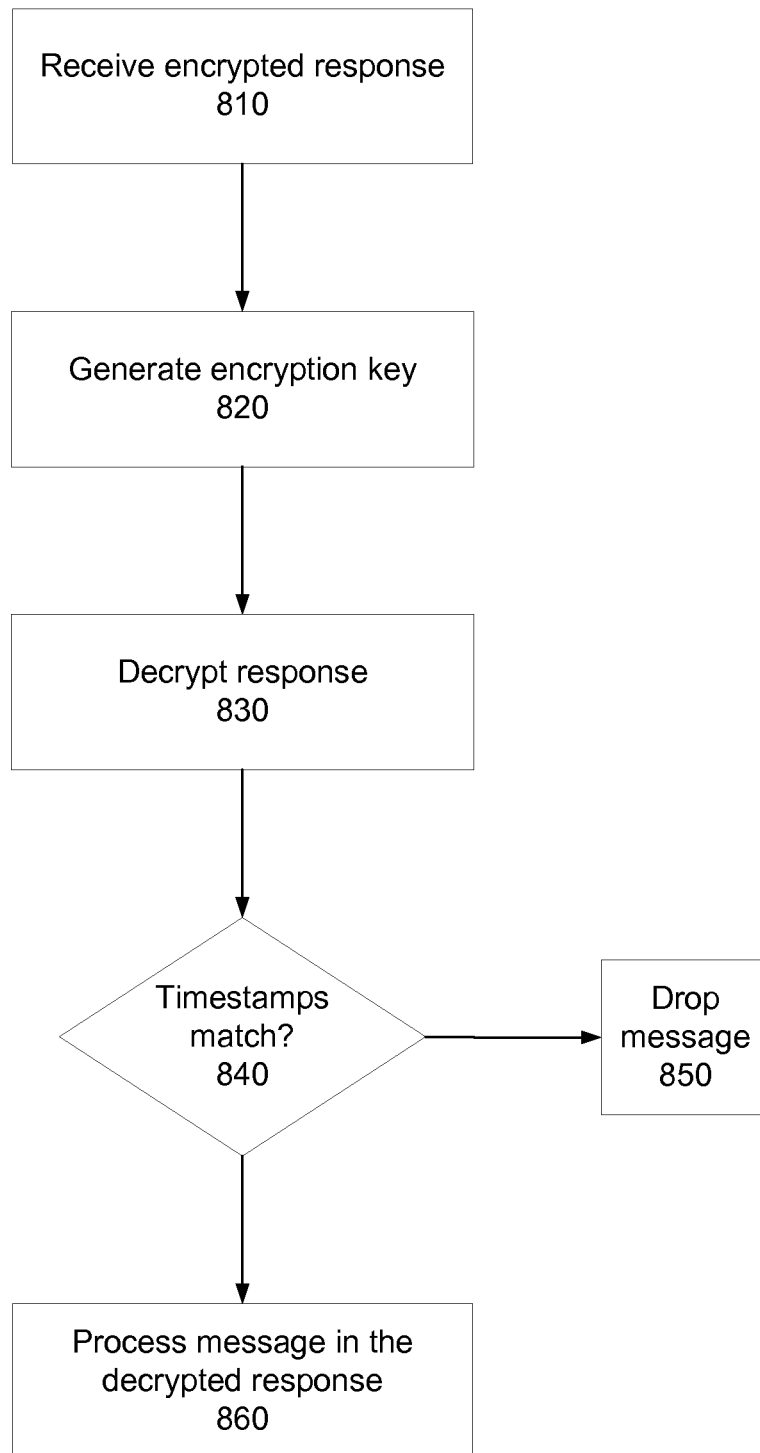
FIG. 8 is a flow chart of an example process for decrypting a response sent by a system to a user device.

FIG. 8 is a flow chart of an example process for decrypting a response sent by a system to a user device. The example process in FIG. 5 can be used by an offline user device to receive and process a response forwarded by a nearby merchant or user device in communication with a payment service system. The example process can be implemented by one or more computer programs installed on one or more computers. The process will be described as being performed by an appropriately programmed user device, e.g., the user device 310 of FIG. 3.

The user device receives the encrypted response (810). For example, a payment service system can send the encrypted response to a nearby merchant or another user device, and the nearby device can communicate the encrypted response to the user device user direct radio signal communication.

The user device generates an encryption key (820). The user device can generate the encryption key in the same way that the system generated the encryption key as describe above with reference to FIG. 6. For example, the user device can use a session token that authenticates the user device to a payment service system as input to an algorithm that generates an encryption key, e.g., HMAC.

The user device decrypts the response (830). Using the generated encryption key, the user device can decrypt the response to obtain the contents of the response. In some implementations, the response includes a message sent from the system that generated the response as well as a timestamp of the original message sent by the user device to the system.

The user device determines whether the timestamps match (840). The user device can compare a timestamp that was included in an original message to the system to a timestamp in the decrypted response from the system. If the timestamps do not match, the user device can drop the message (branch to 850). If the timestamps do match, the user device can determine that the sender of the message is genuine and process the decrypted response (860).

The user device processes the message in the decrypted response (860). After having decrypted the response from the system and having determined that the response is genuine, the user device can process the message in the decrypted response appropriately. For example, if the message indicates that a payment was successful, the user device can display a notification to the user that the payment was successful.

In some cases, the message can cause a user application installed on the user device to retry communication with the system. For example, if the message indicates that a payment failed or should be retried, the user device can resend a message to the system as described above with reference to FIG. 5.

A payment service system includes one or more computers, at least some of which can handle secure transactions, e.g., a secure server. In general, computers of the payment service system can receive requests to process payment transactions with a merchant device or another user device. The computers of the payment service system can also be responsible for transferring or updating a user application on a user's mobile device or transferring or updating a merchant application on a merchant's computing device. The payment service system also handles secure information such as credit card numbers, debit card numbers, bank accounts, user accounts, user identifying information or other sensitive information.

The payment service system can communicate electronically with a computer system of a card payment network, e.g., Visa, Mastercard, or the like. The computer system of the card payment network can communicate in turn with a computer system of a card issuer, e.g., a bank. There can also be computer systems of other entities, e.g., the card acquirer, between the payment service system and the card issuer.

Before the user can use the payment service system to conduct payment transactions, the user creates a user account with the payment service system.

The user can create an account using a mobile application or using an online website, and can use a mobile device or another computing device, e.g., a home computer. At some point prior to the transaction, a user application is downloaded to the user device e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct a transaction with the payment service system. For example, in the case of a credit card account, the user can enter the credit card issuer, credit card number and expiration date into the payment service system; the card validation value and mailing address may also be required. However, the financial account could also be associated with a debit card or pre-paid card, or another third party financial account.

A merchant can sign up for an account with the payment service system using a merchant device or another device. The merchant enters a name, account password, and contact information, e.g., email address, and physical location information, e.g., an address, into the payment service system. The merchant can also provide other information, e.g., a list of goods or services available, operating hours, phone number, a small identifying image logo or mark, to the payment service system. The data associated with the merchant account can be stored at the payment service system, e.g., in a database.

At some point prior to processing a payment transaction, a merchant application is downloaded to a merchant device, e.g., through an application store. Creation of the merchant account can be handled through the merchant application, or through another application, e.g., a generic web browser.

Eventually, in order to receive funds from the transaction, a merchant will need to enter financial account information into the payment service system sufficient to receive funds. For example, in the case of a bank account, the merchant can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A device comprising:
   a direct radio communication interface configured to enable a communication with nearby devices via a direct radio communication scheme;
   memory having computer-readable instructions stored therein; and
   one or more processors configured to execute the computer-readable instructions to:
      detect, using the direct radio communication scheme, a point of sale device in proximity of the device;
      generate, at the device, a first encrypted message using an encryption key and an encryption algorithm installed on the device, for allowing the point of sale device to process a payment for a transaction at the point of sale device, content of the first encrypted message being inaccessible to the point of sale device, the first encrypted message being forwarded by the point of sale device to a payment service system and used for locating financial information of a user associated with the device for processing the payment;
      transmit, using the direct radio communication scheme, the first encrypted message to the point of sale device to be forwarded to the payment service system to initiate processing of the payment; and
      receive, using the direct radio communication scheme and from the point of sale device, a second encrypted message indicative of one of a completion or a denial of the payment for the transaction, the second encrypted message having been generated by the payment service system and forwarded to the point of sale device after processing the payment;
      decrypt, at the device and using the encryption key and a decryption algorithm installed in the device, the second encrypted message to obtain a response indicative of the completion or the denial of the payment transaction; and
      display the response on a display of the device.

2. The device of claim 1, wherein the one or more processors are configured to execute the computer-readable instructions to:
   authenticate the point of sale device.

3. The device of claim 2, wherein the one or more processors are configured to execute the computer-readable instructions to authenticate the point of sale device by validating a digital certificate received from the point of sale device in response to detecting the point of sale device.

4. The device of claim 2, wherein the one or more processors are configured to execute the computer-readable instructions to display, on the display of the device, merchant information associated with the point of sale device upon authenticating the point of sale device.

5. The device of claim 1, wherein the direct radio communication scheme is a near field communication standard.

6. The device of claim 1, wherein the device is one of a wristwatch, a mobile phone, a portable music player, a tablet computer, a laptop computer, a personal digital assistant, a smartphone, or a keychain beacon.

7. The device of claim 1, wherein the first encrypted message includes a token for identifying the financial information of the user.

8. The device of claim 1, wherein the direct radio communication scheme has an operable range of 1 to 100 meters.

9. A method comprising:
   detecting, by a mobile device and using a direct radio communication scheme, a point of sale device in proximity of the mobile device;
   exchanging, by the mobile device and using the direct radio communication scheme, a first encrypted message with the point of sale device, the first encrypted message having been encrypted using an encryption key and an encryption algorithm stored on the mobile device, wherein
      the first encrypted message authorizes a processing of a payment for a transaction at the point of sale device,
      content of the first encrypted message is inaccessible to the point of sale device,
      the first encrypted message is used for locating financial information of a user associated with the mobile device for processing the payment, and
      the point of sale device is configured to forward the first encrypted message to a payment service system to initiate processing of the payment; and
   receiving, by the mobile device and from the point of sale device using the direct radio communication scheme, a second encrypted message indicative of one of a completion or a denial of the payment, the second encrypted message having been generated by the payment service system and forwarded to the point of sale device after processing the payment;
   decrypting, at the mobile device and using the encryption key and a decryption algorithm installed in the mobile device, the second encrypted message to obtain a response indicative of the completion or the denial of the payment transaction; and
   displaying the response on a display of the mobile device.

10. The method of claim 9, further comprising:
authenticating the point of sale device.

11. The method of claim 10, wherein the authenticating includes validating a digital certificate received from the point of sale device in response to detecting the point of sale device.

12. The method of claim 9, wherein the encrypted message includes a token for identifying the financial information of the user.

13. A point of sale device comprising:
a direct radio communication interface configured to enable a communication with nearby devices via a direct radio communication scheme;
memory having computer-readable instructions stored therein; and
one or more processors configured to execute the computer-readable instructions to:
detect, using the direct radio communication scheme, a nearby user device;
receive, using the direct radio communication scheme, a first encrypted message from the nearby user device for allowing the point of sale device to process a payment for a transaction at the point of sale device, content of the first encrypted message being inaccessible to the point of sale device, the first encrypted message having been generated using an encryption key and an encryption algorithm stored on the nearby user device;
forward the first encrypted message and identifying information of the transaction to a payment service system for processing the payment; and
transmit, using the direct radio communication scheme, to the nearby user device a second encrypted message indicative of one of a completion or a denial of the payment, the second encrypted message being decrypted at the nearby user device using the encryption key and a decryption algorithm stored at the nearby user device.

14. The point of sale device of claim 13, wherein the direct radio communication scheme has an operable range of 1 to 100 meters.

15. The point of sale device of claim 13, wherein the first encrypted message includes a token, which when decrypted by the payment service system, is used to validate financial information of the user.

16. The point of sale device of claim 13, wherein the nearby user device is one of a wristwatch, a mobile phone, a portable music player, a tablet computer, a laptop computer, a personal digital assistant, a smartphone, or a keychain beacon.

17. A method comprising:
detecting, by a point of sale device and using a direct radio communication scheme, a nearby user device;
receiving, by the point of sale device using the direct radio communication scheme, a first encrypted message from the nearby user device for allowing the point of sale device to process a payment for a transaction at the point of sale device, content of the first encrypted message being inaccessible to the point of sale device, the first encrypted message having been generated using an encryption key and an encryption algorithm stored on the nearby user device;
forwarding, by the point of sale device, the encrypted message and identifying information of the transaction to a payment service system for processing the payment; and
transmitting, by the point of sale device using the direct radio communication scheme, to the nearby user device a second encrypted message indicative of one of a completion or a denial of the payment, the second encrypted message being decrypted at the nearby user device using the encryption key and a decryption algorithm stored at the nearby user device.

18. The method of claim 17, wherein the first encrypted message is generated by the nearby user device upon being detected by the point of sale device.

19. The method of claim 17, wherein the first encrypted message includes a token for identifying financial information of the user.

20. The method of claim 17, wherein the direct radio communication scheme has an operable range of 1 to 100 meters.

* * * * *